United States Patent
Hiltgen et al.

(10) Patent No.: US 9,158,550 B2
(45) Date of Patent: Oct. 13, 2015

(54) CACHING BASED OPERATING SYSTEM INSTALLATION

(75) Inventors: Daniel Kerry Hiltgen, Los Altos, CA (US); Olivier Alain Cremel, Palo Alto, CA (US); Christopher Patrick Devine, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 831 days.

(21) Appl. No.: 13/162,430

(22) Filed: Jun. 16, 2011

(65) Prior Publication Data
US 2012/0324212 A1    Dec. 20, 2012

(51) Int. Cl.
*G06F 9/44*    (2006.01)
*G06F 9/445*    (2006.01)

(52) U.S. Cl.
CPC *G06F 9/441* (2013.01); *G06F 8/60* (2013.01); *G06F 8/61* (2013.01); *G06F 8/63* (2013.01)

(58) Field of Classification Search
None
See application file for complete search history.

(56) References Cited

U.S. PATENT DOCUMENTS

| | | | |
|---|---|---|---|
| 5,136,711 A * | 8/1992 | Hugard et al. | 713/2 |
| 7,330,967 B1 * | 2/2008 | Pujare et al. | 713/2 |
| 7,334,157 B1 * | 2/2008 | Graf et al. | 714/13 |
| 7,565,517 B1 * | 7/2009 | Arbon | 713/1 |
| 7,600,005 B2 * | 10/2009 | Jamkhedkar et al. | 709/220 |
| 2006/0101259 A1 * | 5/2006 | Chen | 713/2 |
| 2006/0259754 A1 * | 11/2006 | Miller et al. | 713/1 |
| 2007/0101119 A1 * | 5/2007 | Vesterinen et al. | 713/2 |
| 2007/0169112 A1 * | 7/2007 | Wu et al. | 717/174 |
| 2008/0155533 A1 * | 6/2008 | Mittapalli et al. | 717/176 |
| 2009/0271173 A1 * | 10/2009 | Vnukov | 703/27 |
| 2010/0169470 A1 * | 7/2010 | Takashige et al. | 709/223 |
| 2010/0174894 A1 * | 7/2010 | Chen et al. | 713/2 |
| 2010/0241837 A1 * | 9/2010 | Concorso | 713/2 |
| 2010/0250912 A1 * | 9/2010 | Duncan | 713/2 |
| 2011/0078429 A1 * | 3/2011 | Yang et al. | 713/2 |
| 2011/0119348 A1 * | 5/2011 | Gibbons | 709/217 |
| 2011/0126044 A1 * | 5/2011 | Kim et al. | 714/6.12 |
| 2011/0264776 A1 * | 10/2011 | Clerc et al. | 709/222 |
| 2011/0321030 A1 * | 12/2011 | Rajan et al. | 717/170 |
| 2012/0284495 A1 * | 11/2012 | Domsch et al. | 713/2 |

OTHER PUBLICATIONS

Chandra et al., "The collective: a cache-based system management architecture," 2005, Proceedings of the 2nd conference on Symposium on Networked Systems Design & Implementation, vol. 2, pp. 259-272.*

(Continued)

*Primary Examiner* — Thuy Dao
*Assistant Examiner* — Stephen Berman (57) ABSTRACT

An image of system software is installed by loading an executable image of the system software using a boot loader, where the executable image includes a kernel and a plurality of files used by the kernel. The kernel of the system software is executed to generate the image of the system software that includes a copy of the kernel. Generating the image of the system software involves the steps of generating a plurality of pointers that each point to a different one of the files, retrieving the files using the pointers, and storing a copy of the kernel and the files in a storage device from which the system software is to be booted as the image of the system software.

19 Claims, 6 Drawing Sheets

(56) References Cited

OTHER PUBLICATIONS

Nishimura et al., "Virtual Clusters on the Fly—Fast, Scalable, and Flexible Installation," 2007, Seventh IEEE International Symposium on cluster Computing and the Grid, pp. 549-556.*

Sapuntzakis et al., "Optimizing the migration of virtual computers," 2002, ACM SIGOPS Operating Systems Review—OSDI '02: Proceedings of the 5th symposium on Operating systems design and implementatio, vol. 36, Issue SI, Winter 2002, pp. 377-390.*

* cited by examiner

CACHING BASED OPERATING SYSTEM INSTALLATION

BACKGROUND

Figure 1:
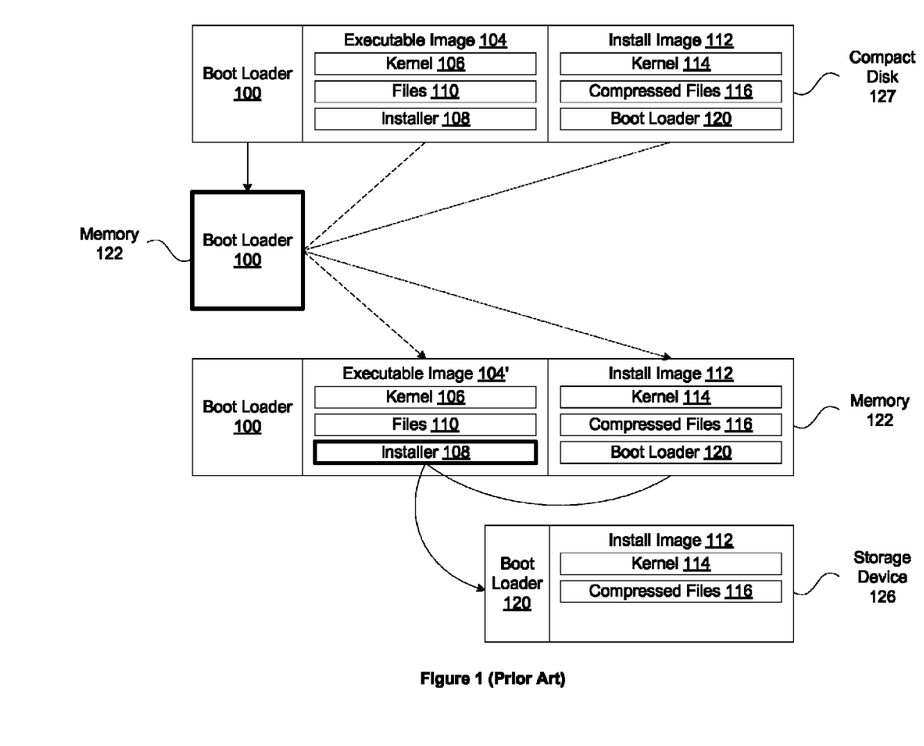
FIG. 1 is a prior art CD-based technique of loading an install image into a computer system.

A computer system is loaded with an install image of system software (hereinafter, "install image") that enables the computer system to boot and execute the system software. Presently, several techniques may be used to load an install image onto a computer system, the most popular and effective technique being compact disk (CD)-based installations and network-based installations. A CD-based installation involves inserting an installation CD into a computer system that is configured to execute installation code (hereinafter, "executable image") stored on the installation CD. FIG. 1 is a block diagram of the CD-based technique of loading an install image 112 into a computer system. As shown, compact disk 127 includes a boot loader 100, an executable image 104 and an install image 112. Executable image 104 includes a kernel 106, files 110 and an installer 108, while install image 112 includes a kernel 114 and compressed files 116. Boot loader 100 is copied by, e.g., bootstrapping software included in the computer system from compact disk 127 to memory 122. In this way, a central processing unit (CPU) in the computer system may read and execute boot loader 100 from memory 122. Boot loader 100 is executed to copy executable image 104 from compact disk 127 to memory 122. Then, installer 108 is executed to copy install image 112 from compact disk 127 to memory 122. Upon completion of copying executable image 104 and install image 112 to memory 122, boot loader 100 then executes kernel 106.

Kernel 106 is dependent on files 110 for proper execution. Examples of such files 110 include TAR files that when extracted provide a directory used by kernel 106 to programmatically perform the loading of install image 112 into the computer system. Files 110 may also include general data that is accessible via the directory used by kernel 106 to copy install image 112 into storage device 126. Specifically, kernel 106 is configured to execute installer 108, which performs the loading of install image 112 into the computer system by copying install image 112 from memory 122 or compact disk 127 to storage device 126. When the computer system is restarted, the install image 112 is loaded into memory 122 by boot loader 120. As known in the art, install image 112 is in a format, such that when it is load into memory 112, the computer system can begin executing system software.

Figure 2:
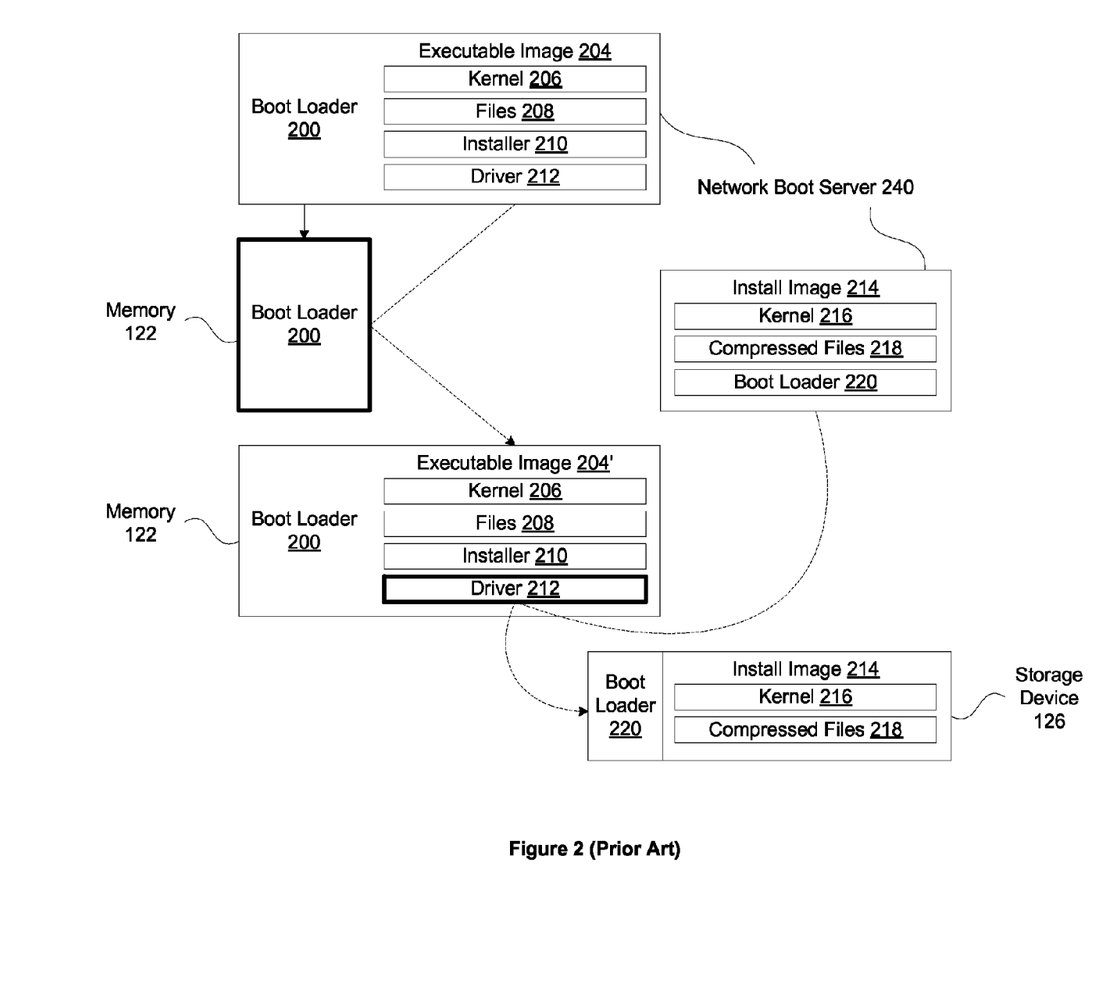
FIG. 2 is a prior art network-based technique of loading an install image into a computer system.

As mentioned above, network-based techniques may also be used to load an install image 112 into a computer system. FIG. 2 is a block diagram of a network-based technique of loading an install image 214 into the computer system. Using conventional network boot techniques, boot loader 200 is copied from network boot server 240 into memory 122 and executed. Boot loader 200 is then executed to copy executable image 204 and the contents thereof from network boot server 240 to memory 122. Upon completion of copying executable image 204 to memory 122, boot loader 200 executes kernel 206, which executes installer 210. Subsequently, driver 212, under the control of installer 210, retrieves install image 214 from network boot server 240 and loads it directly into storage device 126.

Extracting install image 214—which includes kernel 216, compressed files 218, and boot loader 220—from network boot server 240 provides several ease-of-use advantages. For example, an administrator does not have to burn a CD, verify it, walk over to a server in a noisy datacenter, find a terminal, power on the machine on, and wait during the installation. With network-based techniques, the entire process can be done remotely. Unfortunately, network-based techniques suffer from similar problems to those described above in conjunction with FIG. 1. For example, the install image 214 must still at some point be transferred from network boot server 240 to storage device 126, which ultimately results in latencies similar to those described above in conjunction with FIG. 1. Moreover, extracting install image 214 from network boot server 240 is prone to additional complexities, including improper configurations of network boot server 240, packet loss, network failure, and the like.

SUMMARY

One or more embodiments of the present invention provide a technique to install an image of system software that requires less system resources and is faster than the prior art techniques discussed above. According to one or more embodiments of the present invention, the image of the system software is generated dynamically using an installation code that is loaded into memory from an installation storage medium or server, and stored in a storage device for use in subsequent booting. In contrast to the prior art discussed above, a preconfigured install image is no longer needed. As a result, computational resources for reading the preconfigured install image into memory and copying it to a storage device are no longer required.

A method of installing an image of system software, according to an embodiment of the present invention, includes the steps of: prior to booting the system software, (i) loading an executable image of the system software using a boot loader, wherein the executable image includes a kernel of the system software, (ii) executing the kernel of the system software, and (iii) generating the image of the system software from the loaded executable image that includes a copy of the kernel; and storing the image of the system software in a storage device from which the system software is to be booted.

A method of generating an image of system software from an executable image that includes a kernel, and a plurality of files used by the kernel, according to an embodiment of the present invention, includes the steps of: generating a plurality of pointers, each pointing to a different one of the files, retrieving the files using the pointers and compressing each of the files, and storing a copy of the kernel and the compressed files in a storage device from which the system software is to be booted as the image of the system software.

Further embodiment of the present invention includes a non-transitory computer-readable storage medium storing instructions that, when executed by a processor, cause the processor to generate an image of system software from an executable image that includes a kernel and a plurality of files used by the kernel, by performing the steps of: generating a plurality of pointers, each pointing to a different one of the files, retrieving the files using the pointers and compressing each of the files, and storing a copy of the kernel and the compressed files in a storage device from which the system software is to be booted as the image of the system software.

DETAILED DESCRIPTION

Figure 3:
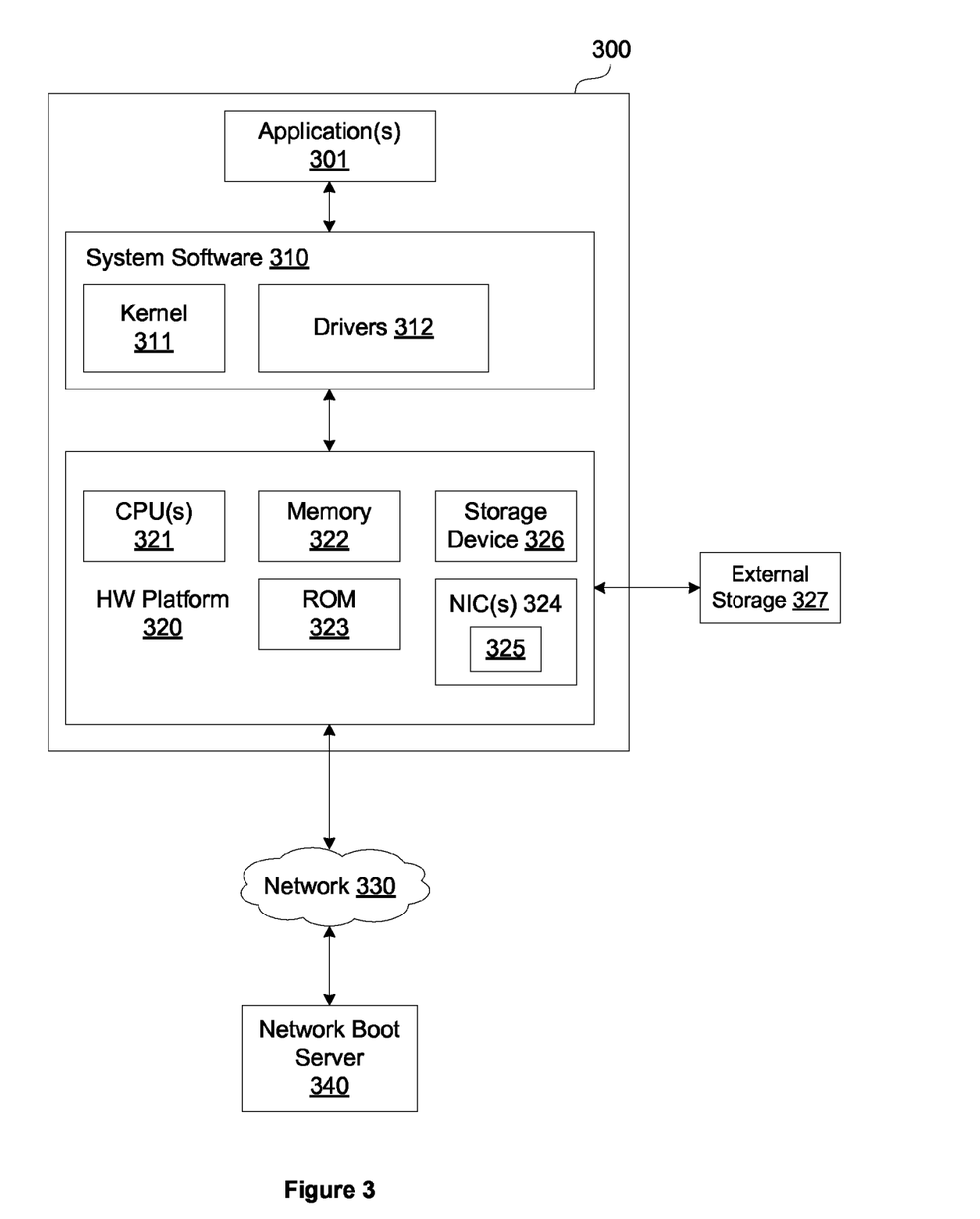
FIG. 3 is a block diagram of a computer system in which one or more embodiments of the present invention may be implemented.

FIG. 3 is a block diagram of a computer system 300 in which one or more embodiments of the present invention may be implemented. Computer system 300 includes one or more applications 301 that are running on top of system software 310. System software 310 includes a plurality of software layers including a kernel 311 that manages hardware resources provided by hardware platform 320 through various drivers 312, and is executed when an install image is loaded into memory 322 from storage device 326. In one embodiment, system software 310 is an operating system (OS), such as operating systems that are commercially available. In another embodiment, system software 310 is a hypervisor that may be included as a component of VMware's vSphere® product, which is commercially available from VMware, Inc. of Palo Alto, Calif., that supports virtual machine applications running thereon.

Hardware platform 320 includes one or more central processing units (CPUs) 321, memory 322, read-only-memory (ROM) 323, one or more network interface cards (NICs) 324 that connect computer system 300 to a network 330, a storage device 326, and an external storage 327. In one embodiment, the ROM 323 includes bootstrapping software that is configured to automatically execute when computer system 300 is powered on. Such bootstrapping software is typically configured to, when storage device 326 does not contain a bootable image of system software 310, locate and execute bootable software residing on, e.g., external storage 327 or network boot server 340. External storage 327 may be any medium capable of storing data such as a CD-ROM, flash memory drive, and the like.

The aforementioned prior-art techniques of loading install images suffer from at least redundant transfer of data and networking complexities. To cure these deficiencies, embodiments of the present invention set forth a new technique described below in conjunction with FIGS. 4-6.

Figure 4:
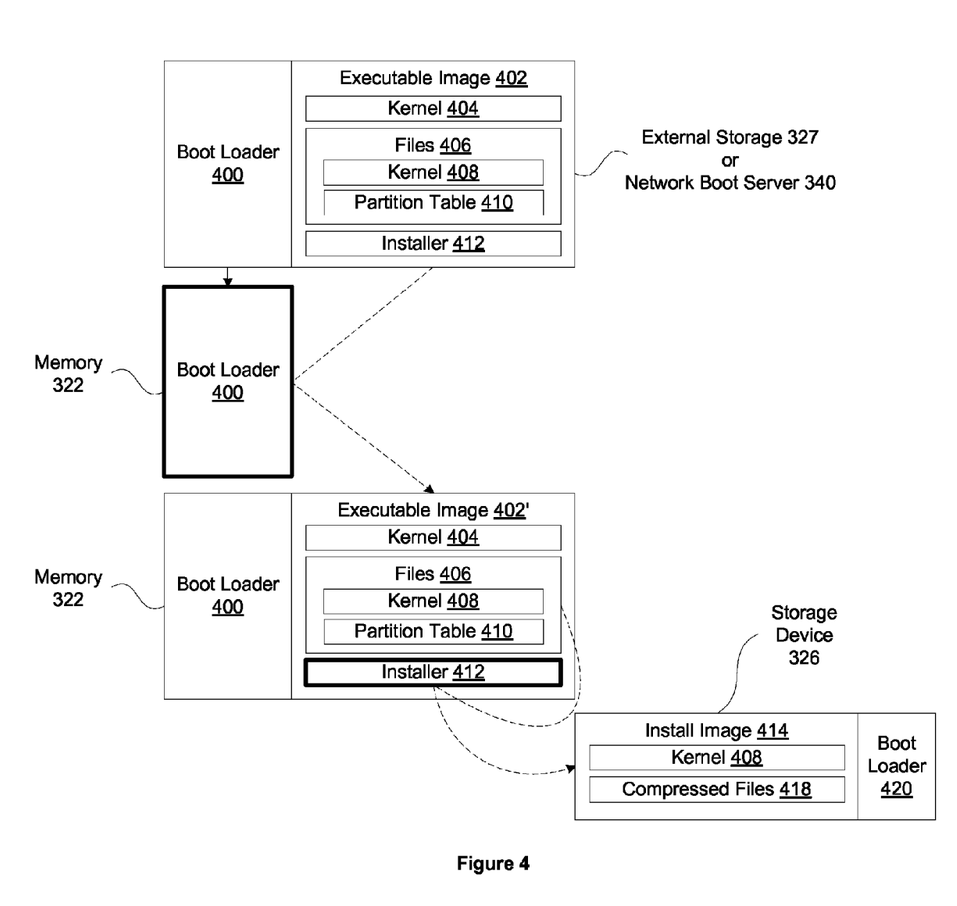
FIG. 4 is a conceptual diagram of a technique for generating an install image based on an executable image according to one or more embodiments of the present invention.

FIG. 4 is a conceptual diagram of a technique for generating an install image based on an executable image according to one or more embodiments of the present invention. As shown in FIG. 4, a boot loader 400 is loaded into memory 322 and is configured to copy executable image 402 from external storage 327 or network boot server 340 to memory 322. Executable image 402 includes kernel 404, installer 412, and files 406. Files 406 may be in a compressed or uncompressed format depending on, e.g., whether executable image 402 is stored in external storage 327 or network boot server 340. For example, if external storage 327 is a compact disk, then files 406 may be stored in a compressed format to increase the amount of additional storage space that is available on the compact disk. When files 406 are compressed, boot loader 400 decompresses files 406 as they are loaded into memory 322. Files 406 include additional files not found in executable image 104 and executable image 204, e.g., files 406 include boot loader 420 which loads install image 414 into memory 322 when a computing system to which storage device 326 belongs is powered on. The additional files also include kernel 408 and partition table 410, where kernel 408 is a copy of kernel 404. The copy of kernel 404, i.e., kernel 408 is required since kernel 404 becomes modified from its original state when it is executed during the generation of install image 414.

Executable image 402, when executed, causes kernel 404 to be executed. Kernel 404, when executed, causes installer 412 to be executed, and installer 412 is configured to generate install image 414 and store install image 414 in storage device 326. Prior to generating install image 414, installer 412 partitions storage device 326 based on partition table 410. In some embodiments, the partition table 410 may instead be a set of partition rules included in executable image 402 such that installer 412 may partition storage device 326 on-the-fly. Such partitions include at least a partition for kernel 408 and files that are compressed and stored as compressed files 418. However, embodiments of the invention are not limited to such partitions and may be carried out using a single partition of storage device 326. In addition, in some embodiments, the files are not compressed before they are stored in the partitions. Next, installer 412 copies kernel 408 to storage device 326. Installer 412 compresses the remainder of files 406 and stores them in storage device 326 as compressed files 418, according to a detailed technique described below in conjunction with FIG. 5. Thus, embodiments of the present invention enable the generation of install image 414 without requiring that install image 414 be preconfigured and stored in external storage 327 or network boot server 340 and copied entirely to memory 322. In turn, the amount of data that is transmitted between external storage 327 or network boot server 340 and memory 322 is reduced, to thereby decrease the overall latency of storing install image 414 in storage device 326.

Figure 5:
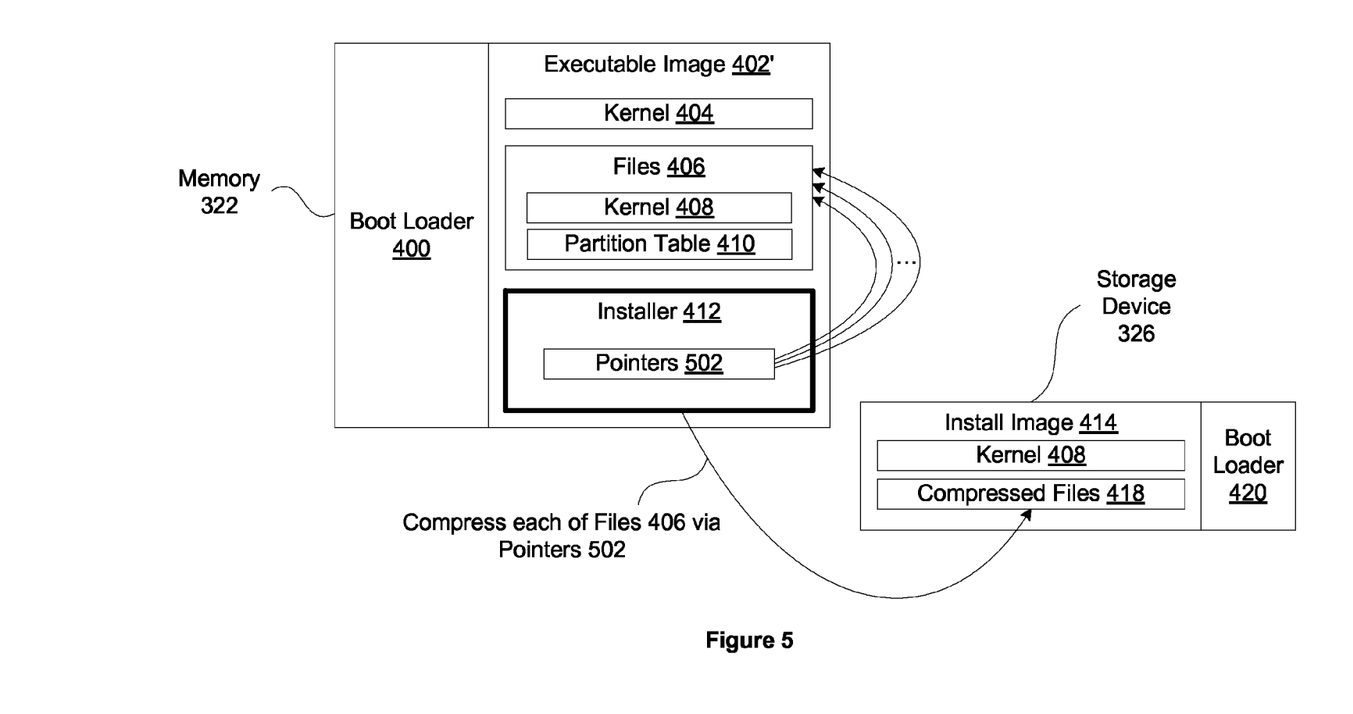
FIG. 5 is a conceptual diagram that illustrates a technique for converting files included in an executable image to files included in an install image according to one or more embodiments of the present invention.

FIG. 5 is a conceptual diagram that illustrates a technique for converting files included in an executable image to files included in an install image according to one or more embodiments of the present invention. As discussed above, files 406 are stored in various locations of memory 322 in uncompressed format. Installer 412 generates a plurality of pointers 502 that each reference one of these locations in memory 322. After these pointers are generated, installer 412 compresses each of files 406 that are referenced by these pointers and stores them as compressed files 418 in appropriate partitions of storage device 326. In one embodiment, partition table 410 is used to determine the partitions in which compressed files 418 are to be stored.

Figure 6:
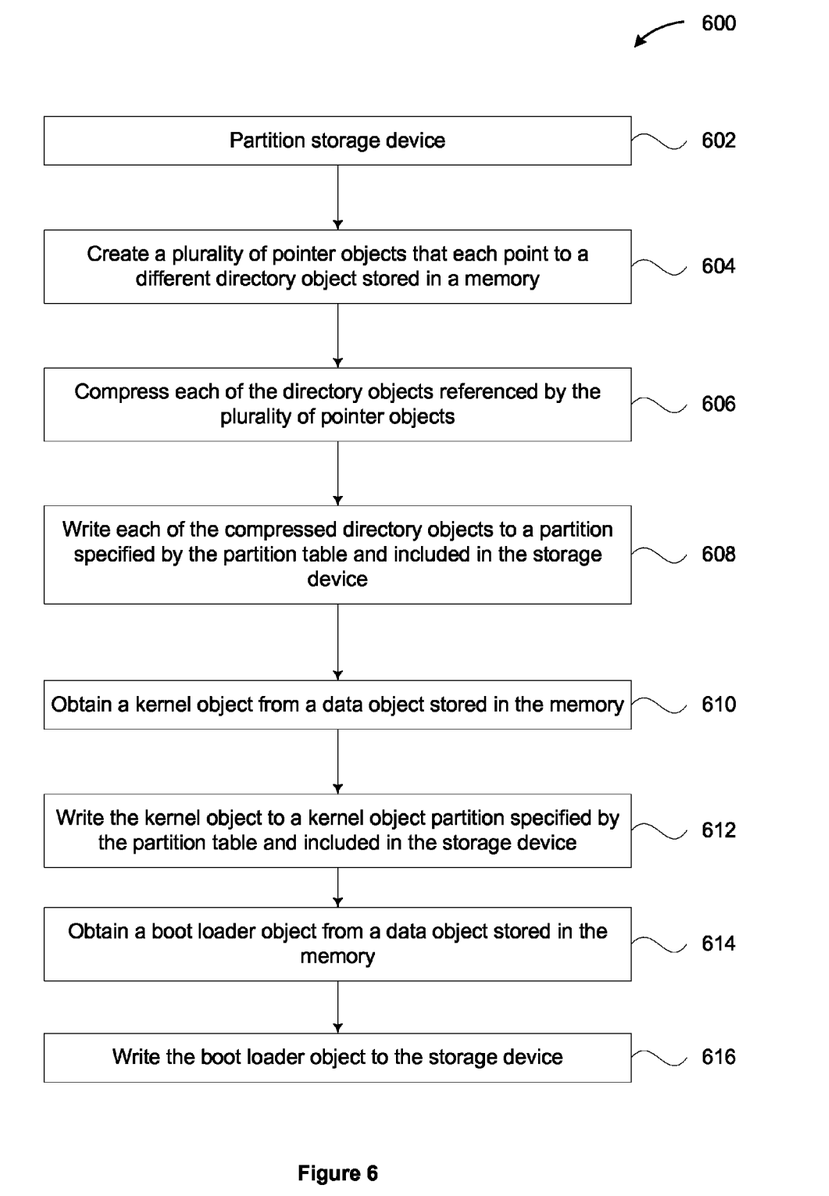
FIG. 6 is a flow diagram that illustrates a method for generating an install image based on an executable image according to one or more embodiments of the present invention.

FIG. 6 is a flow diagram that illustrates generating an install image based on an executable image according to one or more embodiments of the present invention. At step 602, installer 412 reads partition table 410 and partitions storage device 326 according to partition table 410. At step 604, installer 412 creates a plurality of pointers that each point to a different directory object stored in memory 322, as described above in conjunction with FIG. 5. Again, such directory objects are unmodified and identical in composition to files 406 included in executable image 402 from which they were originally copied into memory 322. At step 606, installer 412 compresses each of the directory objects referenced by the plurality of pointers. At step 608, installer 412 writes each of the compressed directory objects to a partition specified by the partition table and included in storage device 326. At step 610, installer 412 obtains a kernel object from a data object stored in memory 322. At step 612, installer 412 writes the kernel object to a kernel object partition specified by the partition table and included in storage device 326. At step 614, installer 412 obtains a boot loader object from a data object stored in memory 322. At step 616, installer 412 writes the boot loader object to storage device 326.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of installing an image of system software, comprising:
    prior to booting the system software: (i) loading an executable image of the system software using a boot loader, wherein the executable image includes a kernel of the system software and a copy of the kernel, (ii) executing the kernel of the system software, and (iii) in response to executing the kernel of the system software, generating the image of the system software from the loaded executable image that includes the copy of the kernel; and
    storing the image of the system software in a storage device from which the system software is to be booted, including copying the copy of the kernel to the storage device, wherein the executable image further includes a partition table for partitioning the storage device, wherein generating the image of the system software comprises creating a plurality of pointers that each points to a different directory object, wherein storing the image of the system software in the storage device comprises compressing each of the directory objects referenced by the plurality of pointers and writing each of the compressed directory objects to a partition of the storage device specified by the partition table of the executable image.

2. The method of claim 1, wherein the boot loader obtains the executable image from a computer-readable medium.

3. The method of claim 1, wherein the boot loader obtains the executable image from a network server.

4. The method of claim 1, wherein the storage device is partitioned according to a set of partition rules included in the executable image.

5. The method of claim 1, wherein the executable image further includes a plurality of file objects.

6. The method of claim 5, wherein the plurality of file objects includes the directory objects that are accessed by the kernel during execution.

7. The method of claim 6, wherein the kernel accesses additional data included in the plurality of file objects via the directory objects.

8. The method of claim 5, wherein the plurality of file objects includes the copy of the kernel.

9. The method of claim 5, wherein the plurality of file objects includes another boot loader.

10. A non-transitory computer-readable storage medium storing instructions that, when executed by a processor, cause the processor to install an image of system software, by performing the steps of:
    prior to booting the system software: (i) loading an executable image of the system software using a boot loader, wherein the executable image includes a kernel of the system software and a copy of the kernel, (ii) executing the kernel of the system software, and (iii) in response to executing the kernel of the system software, generating the image of the system software from the loaded executable image that includes the copy of the kernel; and
    storing the image of the system software in a storage device from which the system software is to be booted, including copying the copy of the kernel to the storage device, wherein the executable image further includes a partition table for partitioning the storage device, wherein generating the image of the system software comprises creating a plurality of pointers that each points to a different directory object, wherein storing the image of the system software in the storage device comprises compressing each of the directory objects referenced by the plurality of pointers and writing each of the compressed directory objects to a partition of the storage device specified by the partition table of the executable image.

11. The non-transitory computer-readable storage medium of claim 10, wherein the boot loader obtains the executable image from a computer-readable medium.

12. The non-transitory computer-readable storage medium of claim 10, wherein the boot loader obtains the executable image from a network server.

13. The non-transitory computer-readable storage medium of claim 10, wherein the storage device is partitioned according to a set of partition rules included in the executable image.

14. The non-transitory computer-readable storage medium of claim 10, wherein the executable image further includes a plurality of file objects.

15. The non-transitory computer-readable storage medium of claim 14, wherein the plurality of file objects includes the directory objects that are accessed by the kernel during execution.

16. The non-transitory computer-readable storage medium of claim 15, wherein the kernel accesses additional data included in the plurality of file objects via the directory objects.

17. The non-transitory computer-readable storage medium of claim 14, wherein the plurality of file objects includes the copy of the kernel.

18. The non-transitory computer-readable storage medium of claim 14, wherein the plurality of file objects includes another boot loader.

19. The method of claim 1, wherein the system software comprises a hypervisor.

* * * * *